(12) United States Patent
Sturman

(10) Patent No.: US 8,365,701 B1
(45) Date of Patent: Feb. 5, 2013

(54) DIESEL ENGINES OPERATING WITH AN EQUIVALENCE RATIO NEAR UNITY

(75) Inventor: Oded Eddie Sturman, Woodland Park, CO (US)

(73) Assignee: Sturman Digital Systems, LLC, Woodland Park, CO (US)

( * ) Notice: Subject to any disclaimer, the term of this patent is extended or adjusted under 35 U.S.C. 154(b) by 429 days.

(21) Appl. No.: 12/789,050

(22) Filed: May 27, 2010

Related U.S. Application Data

(60) Provisional application No. 61/182,576, filed on May 29, 2009.

(51) Int. Cl.
*F02B 33/10* (2006.01)
(52) U.S. Cl. ........... 123/316; 123/26; 123/532; 123/699
(58) Field of Classification Search ............ 123/26, 123/316, 321, 434, 532, 699
See application file for complete search history.

(56) References Cited

U.S. PATENT DOCUMENTS

| | | | |
|---|---|---|---|
| 6,415,749 B1 | 7/2002 | Sturman et al. | |
| 6,739,293 B2 | 5/2004 | Turner et al. | |
| 7,353,786 B2* | 4/2008 | Scuderi et al. | 123/68 |
| 7,588,001 B2* | 9/2009 | Branyon et al. | 123/70 R |
| 8,006,656 B2* | 8/2011 | Branyon et al. | 123/70 R |
| 2007/0113803 A1* | 5/2007 | Froloff et al. | 123/90.11 |
| 2007/0245982 A1 | 10/2007 | Sturman | |
| 2008/0264393 A1 | 10/2008 | Sturman | |
| 2009/0183699 A1 | 7/2009 | Sturman | |

OTHER PUBLICATIONS

Stewart, Jeffrey, et al., "The Digital Engine—Combustion Control Using Hydraulic Valve Actuation and Air Injection" *The 7th COMODIA International Conference on Modeling and Diagnostics for Advanced Engine Systems*, Hokkaido University, Sapporo, Japan, (Jul. 28-31, 2008).

* cited by examiner

*Primary Examiner* — Erick Solis
(74) *Attorney, Agent, or Firm* — Blakely Sokoloff Taylor & Zafman LLP

(57) ABSTRACT

A method of operating a multi-cylinder compression ignition engine having at least one cylinder acting as a compression cylinder and at least one cylinder action as a combustion cylinder. The method comprise compressing air in the compression cylinder, and in the combustion cylinder, opening and then closing an exhaust valve during an exhaust stroke to trap some exhaust gas, during a compression stoke immediately following the exhaust stroke, injecting a controlled amount of fuel into the combustion chamber to obtain compression ignition at or near a top dead center piston position without reaching combustion temperatures at which $NO_X$ is formed, and injecting compressed air and fuel during a power stroke immediately following the compression stroke to sustain combustion to burn the fuel with an equivalence ratio within a predetermined range around unity. Various embodiments are disclosed.

28 Claims, 3 Drawing Sheets

DIESEL ENGINES OPERATING WITH AN EQUIVALENCE RATIO NEAR UNITY

CROSS-REFERENCE TO RELATED APPLICATION

This application claims the benefit of U.S. Provisional Patent Application No. 61/182,576 filed May 29, 2009.

BACKGROUND OF THE INVENTION

1. Field of the Invention

The present invention relates to the field of internal combustion engines such as diesel engines, gasoline engines and engines designed to operate on other or alternate fuels.

2. Prior Art

The preferred embodiments of the present invention are intended to be used in engines of the general type disclosed in U.S. Published Application No. 2007/0245982, published on Oct. 25, 2007, the disclosure of which is hereby incorporated by reference. That application discloses engines that compress air in a compression cylinder and inject fuel or fuel and air into a combustion cylinder during a compression stroke, and air or fuel and air after ignition. Of particular interest to the present invention is the method of operating an engine disclosed therein of injecting fuel or fuel and a little air into the residual hot exhaust gases during the compression stroke to convert the fuel to a gaseous form, then obtaining compression ignition, typically at or near top dead center, using the oxygen in the residual exhaust gases and air injected, if any, and then injecting air after the piston in the combustion cylinder moves past top dead center to maintain combustion during the power stroke. Such a method of operation better mixes the fuel and air, helps avoid local hot spots in the combustion cylinder, and allows an overall control of combustion for more complete combustion and to avoid combustion temperatures at which $NO_X$ will be formed. It also extends combustion through a greater crankshaft angle for more efficient energy conversion to engine shaft output power. Still, in comparison to conventional diesel engines wherein fuel is injected into an oxygen rich environment, the above described method injects air into a fuel rich environment, either of which has the potential to cause $NO_X$ or soot formation.

Also the embodiments in the foregoing disclosure contemplated use of a high pressure storage tank for storing air for injection, and could also store compressed air when the engine was being used as a brake to recover some of that energy for later use. While storing compressed air when the engine is being used as a brake to recover some of that energy for later use is practical, pumping air into and injecting air from a storage tank in normal engine operation is less than ideal, in that considerable energy can be lost by the intervening cooling of the compressed air.

The engines of U.S. Published Application No. 2007/0245982 use camless engines of the general type disclosed in U.S. Pat. No. 6,739,293, the disclosure of which is hereby incorporated herein by reference.

DETAILED DESCRIPTION OF THE PREFERRED EMBODIMENTS

Figure 1:
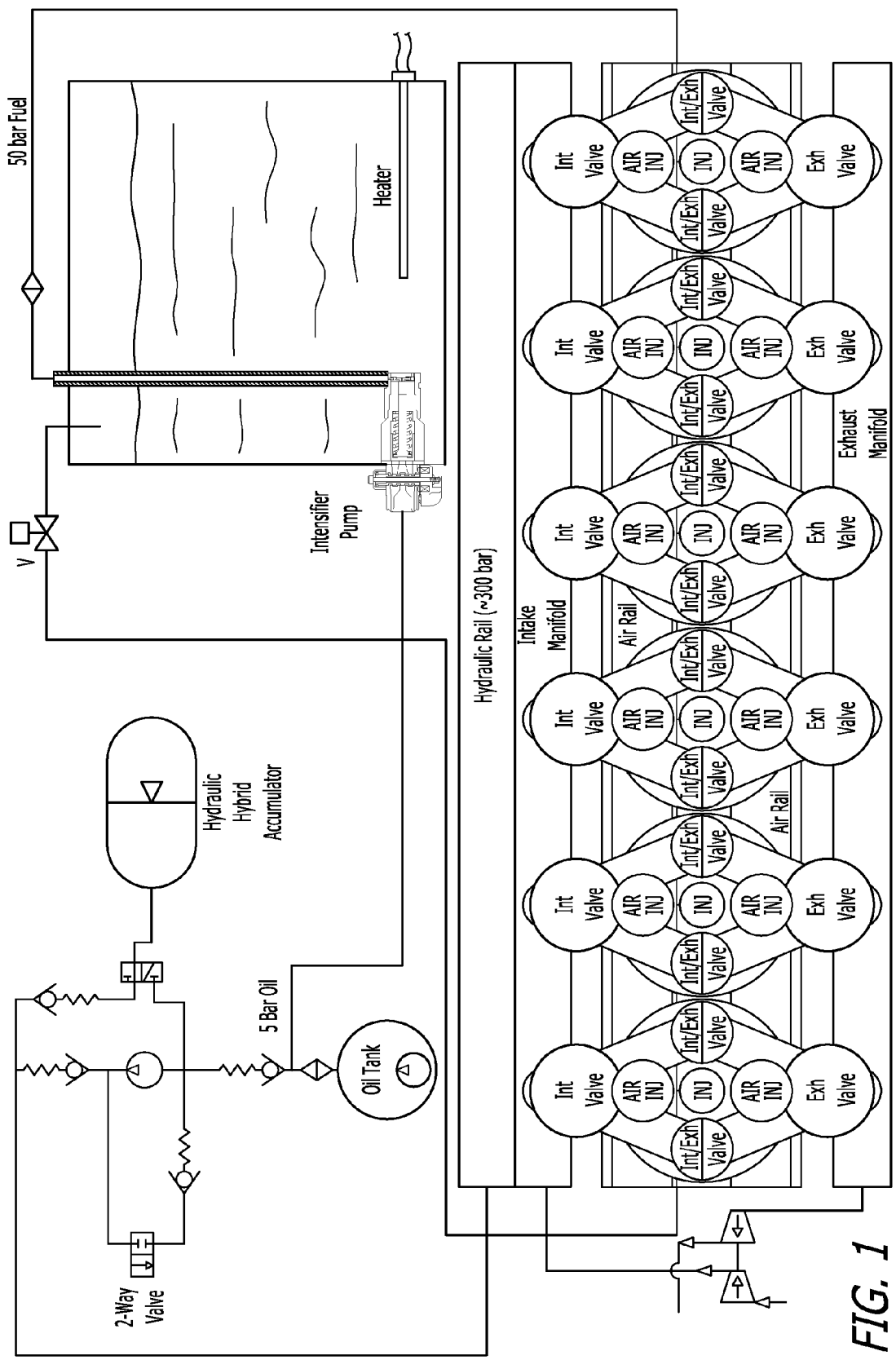
FIG. 1 is a schematic illustration of an overhead valve engine system in accordance with an embodiment of the present invention.

First referring to FIG. 1, a schematic illustration of an overhead valve engine system in accordance with an embodiment of the present invention may be seen. The engine illustrated is a six cylinder engine having electronic control of fuel injector operation, and being of a camless design with electronic control of engine valve operation. Each cylinder has four valves, two air injection valves each labeled Air Inj, two additional valves each labeled Int/Exh Valve, and a fuel injector INJ. The valves labeled Int/Exh Valve are each manifolded to a large Int Valve for coupling to the Intake Manifold and a large Exh Valve for coupling to the Exhaust Manifold. By control of the Int Valve and Exh Valve, both Int/Exh Valves may be used for both air intake and exhaust functions in a combustion cylinder, making up for the dedication of two engine valves Air Inj for air injection. The air injection valves Air Inj are coupled to the Air Rails to either deliver high pressure air to the Air Rails, or to inject high pressure air into a combustion chamber, depending on whether a particular cylinder is then being used as a compression cylinder or a combustion cylinder. Methods and apparatus allowing one or more engine valves to be used for both intake and exhaust valves are disclosed in U.S. Published Application No. 2007-0215078, the disclosure of which is hereby incorporated herein by reference.

Also shown in FIG. 1 is the injector actuation fluid supply, in the preferred embodiment engine oil at normal engine operating pressures (5 bar in this example), which pump P increases to 300 bar for supplying to the Hydraulic Rail. A Hydraulic Hybrid Accumulator provides storage of actuation fluid at the high pressure, with the 2-Way Valve providing a controllable return from the pump output to the pump input to allow efficient use of a constantly operating (when the engine is operating) positive displacement pump by recirculating the pump output to the low pressure, pump input as required to control its volumetric output at the high pressure, with venting of the high pressure being prevented by an appropriately placed check.

Also shown in FIG. 1 is a Fuel Tank having an Intensifier Pump and Heater. The Intensifier Pump is powered by engine oil at normal engine oil pressures, and pumps the fuel to a pressure (50 bar in this example) on the order of 10 times the engine oil pressure (5 bar in this example). The Heater is optional, but is useful with alternate fuels that tend to become too thick at low temperatures to flow into the pump. The fuel system includes a controllable valve V, useful on startup to first allow circulation of fuel through the fuel system and back to the Fuel Tank to provide heated fuel to the injectors INJ before cranking the engine for starting. The Intensifier Pump is a piston type pump, preferably but not necessarily, synchronized with the injectors INJ so as to pump between injections to refill the intensifier in the injectors between injections. While a single Intensifier Pump is shown, in a multi-cylinder engine, more than one such pump may be used, depending on the number of combustion cylinders in the engine. Alternatively some form of small accumulator may be used in the fuel supply to the injectors.

The engine depicted in FIG. 1 uses an exhaust driven turbocharger (Turbo) to increase the Intake Manifold pressure. This is optional, but is desirable to maximize power output for a given engine size.

One aspect of the present invention is the two Air Rails running along the engine head, preferably directly over the engine valves coupled thereto. These rails provide direct high pressure (and hot because of the heat of compression) air communication between the cylinders then being used for compression and the cylinders then being used for combustion. This direct connection minimizes the time between compression and injection of the air, and thus helps minimize the heat loss from the high pressure air. It is in essence just-in-time delivery, without significant storage, of the high pressure air for injection. Heat loss may further be reduced by use of an insulative high temperature coating on the inner surfaces of the Air Rails, if desired. An Air Storage tank preferably is coupled to the Air Rails as a buffer, and for high pressure air storage during engine braking. A valve may be used to connect and disconnect the air storage tank from the Air Rails to allow storage of high pressure air, such as from engine braking, for later use such as when a burst of engine power is needed.

One aspect of the invention is the fact that the Air rails are in the Engine Head, while the Intake and the Exhaust Manifolds are bolt-on manifolds, as in a conventional overhead engine valve engine. The Hydraulic Rail may be bolt-on or in the engine head, though usually will be a bolt-on rail, primarily because of the space limitations in the head itself. The placement of the Air Rails directly in the Engine Head as shown is preferred, but not a limitation of the invention, as it provides immediate communication of high pressure air from a compression cylinder to a combustion cylinder with minimal heat and viscous losses. Obviously only one air rail may be used if desired.

As an alternative, certain cylinders may be dedicated as compression cylinders and certain cylinders dedicated as combustion cylinders. The only difference is that while both types of cylinders are coupled to the Air Rail, a compression cylinder has two Engine Valves coupled to the Intake Manifold and a combustion cylinder has a fuel injector INJ and has two Engine Valves coupled to the Exhaust Manifold. As a further alternative, each cylinder may have a fuel injector INJ and dedicated Intake and Exhaust Valves, so that any cylinder may be used as a compression cylinder and a combustion cylinder at different times, but without using any one engine valve for both an intake and an exhaust valve. Making all cylinders the same provides better heat distribution in the engine by using any cylinder for compression and combustion at different times, better allowing retrofit of existing engines with the present invention because of the lack of a need for special cooling provisions. This also allows better use of the engine for braking, and the recovery of energy by coupling the Air Rail to an air storage tank during engine braking, and the later use of all cylinders as combustion cylinders for a short burst of power using the stored compressed air. Also during engine braking, the Hydraulic Hybrid Accumulator may be filled with high pressure oil for later use. In normal operation, the combustion cylinders are operated in a two cycle mode, though this is not a limitation of the invention.

One important aspect of the present invention is the operating cycles that are used. In particular, it is the intention of this aspect of the present invention to operate a compression ignition engine with an Equivalence Ratio of approximately one, and to limit the maximum temperature reached in the combustion cylinder to below the temperature at which $NO_X$ will be formed. (The equivalence ratio is defined as the ratio of the fuel-to-oxidizer ratio to the stoichiometric fuel-to-oxidizer ratio.) This may be seen in FIG. 2, which pictorially displays the regimes in which soot and $NO_X$ are formed in a plot of Equivalence Ratio versus Flame Temperature. The intention is to control the engine to confine combustion to the approximate region identified in FIG. 2 as the Sturman cycle regime. This may be done by coordinating the injection of air and fuel into the combustion cylinder, together with the operation of the engine valves, to obtain ignition in the combustion cylinder when the piston is at or near top dead center, and to limit the Equivalence Ratio during combustion by avoiding either a substantially fuel rich or substantially air rich combustion charge. This may be done by alternating between fuel and air injection, limiting the amount of each injection so that the combustion cylinder charge alternates between somewhat fuel rich and somewhat air rich until all fuel and air that is to be injected is injected. Alternatively, the fuel and air injection may be overlapping or simultaneous, though still preferably limited in rate, such as by pulse injection. In particular, preferably the process is drawn out over a substantial crankshaft angle after top dead center for most efficient conversion of the combustion cylinder pressures to mechanical energy, as high combustion cylinder pressures near or at top dead center yield inefficient or no conversion of the combustion cylinder pressures to mechanical energy.

Figure 3:
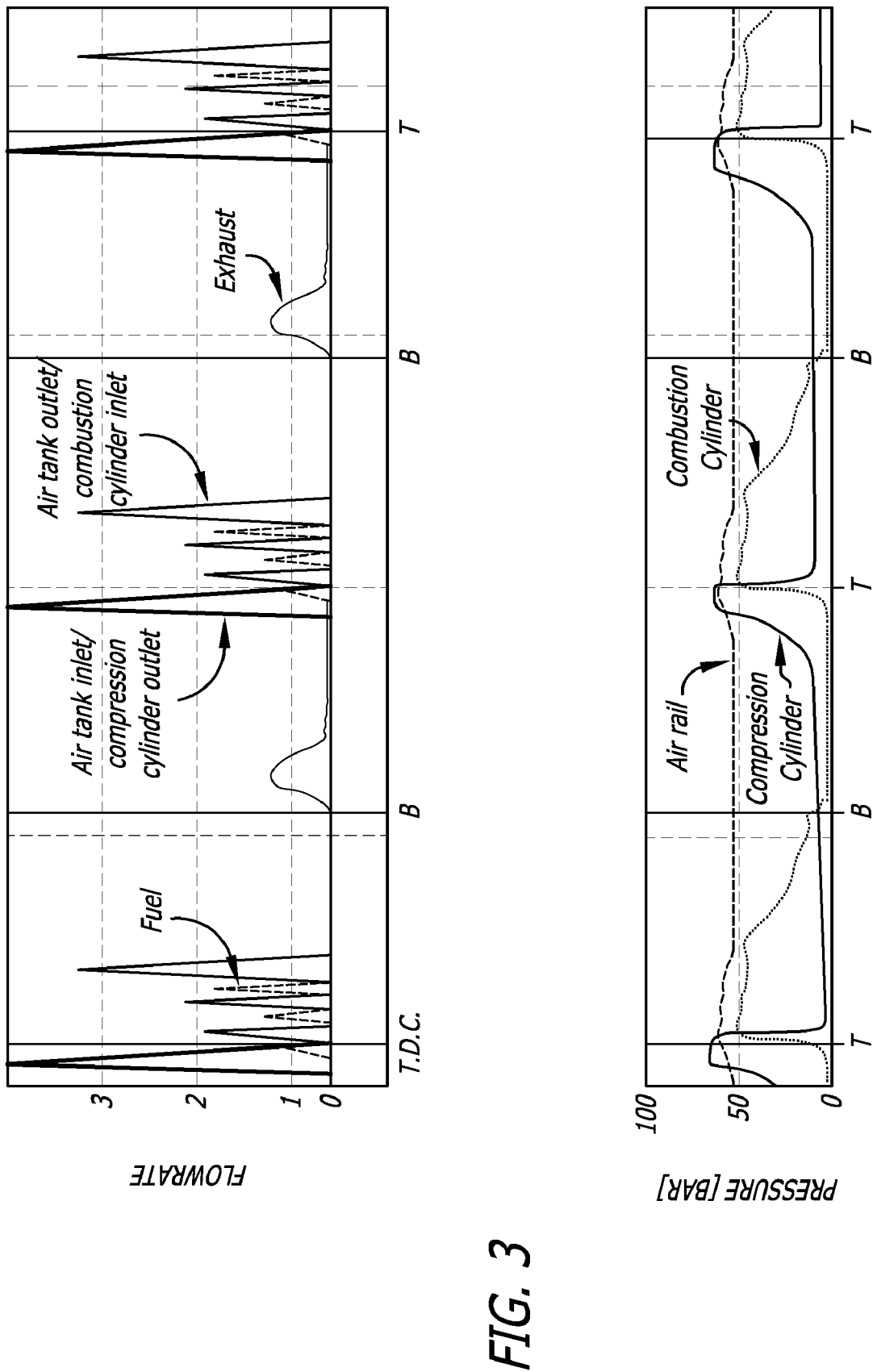
FIG. 3 illustrates exemplary pressures and flow rates in the cylinders of an exemplary engine operating with an Equivalence Ratio near one.

FIG. 3 illustrates exemplary pressures and flow rates in the cylinders. The lower graph shows the pressure in a compression cylinder (solid line), in the Air Rails (dashed line) and in a combustion cylinder (dotted line) versus the crankshaft angle (B=bottom dead center and T=top dead center). The peak pressure in the compression cylinder of course slightly exceeds the Rail Pressure, in this embodiment buffered by a storage tank to smooth out the peak pressures in the Air Rail. Similarly, the pressures in a combustion cylinder are slightly less than the pressure in the Air Rails to assure the ability to inject air into a combustion cylinder during combustion. Also illustrated in the lower graph of FIG. 3 is the fact that pressures in a combustion cylinder are sustained for quite a substantial crankshaft angle after ignition for a more efficient conversion of a combustion cylinder pressure to mechanical energy.

The upper curves of FIG. 3 schematically indicate the relative flow rates of air out of a compression cylinder (heavy solid line), the exhaust flow (lightest solid line), and the staggered fuel (dashed line) and air injection (intermediate solid line) into a combustion cylinder. It will be noted that the fuel and air flow rates are shown to increase as the piston moves away from top dead center. As the piston moves away from top dead center, the piston is accelerating away from the top dead center position, and thus the combustion charge is expanding faster and faster and tending to cool accordingly, so that increased fuel and air injection rates can be used further away from the top dead center position (and may be needed) to sustain combustion without exceeding $NO_X$ formation temperatures. Also note that these increased injection rates may or may not represent an increase in comparison to the total content of the combustion chamber already present, so the variance in the equivalence ratio will not change much during these increased flow rates.

The operation illustrated is a two cycle or two stroke operation of both a compression and a combustion cylinder. It will be noted that the exhaust occurs during only part of what would normally be the exhaust stroke of the piston, and thereafter residual hot exhaust gases are trapped in the combustion cylinder. As an alternative, a full exhaust stroke may be carried out, followed by a late closing of the exhaust valve, or even a closing followed by another opening and closing of the exhaust valve during the initial part of the following intake stroke. After substantial recompression, fuel is injected into the hot, high pressure exhaust gas. Ignition may occur based on the excess air remaining in the exhaust gas, with temperatures being limited by the limited air present, or ignition may effectively occur at the time of initial injection of air. Either way, ignition and temperatures may be controlled by control of the engine valves, particularly the exhaust valve(s), together with control of the fuel injection and air injection, with adjustments being made cycle to cycle to correct minor deviations from the desired operation of the engine. Note also that in normal, substantial load operation, at any one time, normally half the cylinders would be used as compression cylinders and half for combustion cylinders, though that is not a limitation of the invention. Under other load conditions, the ratio of compression cylinders to combustion cylinders may be varied, skip cycles may be imposed, etc. as desired.

Since every cylinder in the exemplary embodiment disclosed has a fuel injector, and has engine valves for coupling to the intake manifold and to the exhaust manifold, the engine may be operated as a conventional compression ignition (diesel) engine. Such operation may be used, for example, during engine starting, with the engine then transitioning to the operating mode described herein, though it should be understood that the flexibility provided by the electronic control of the fuel injectors and the engine valves allows operation of the engine using not only the modes of operation specifically described herein, but also operation with a wide variety of other modes.

Figure 2:
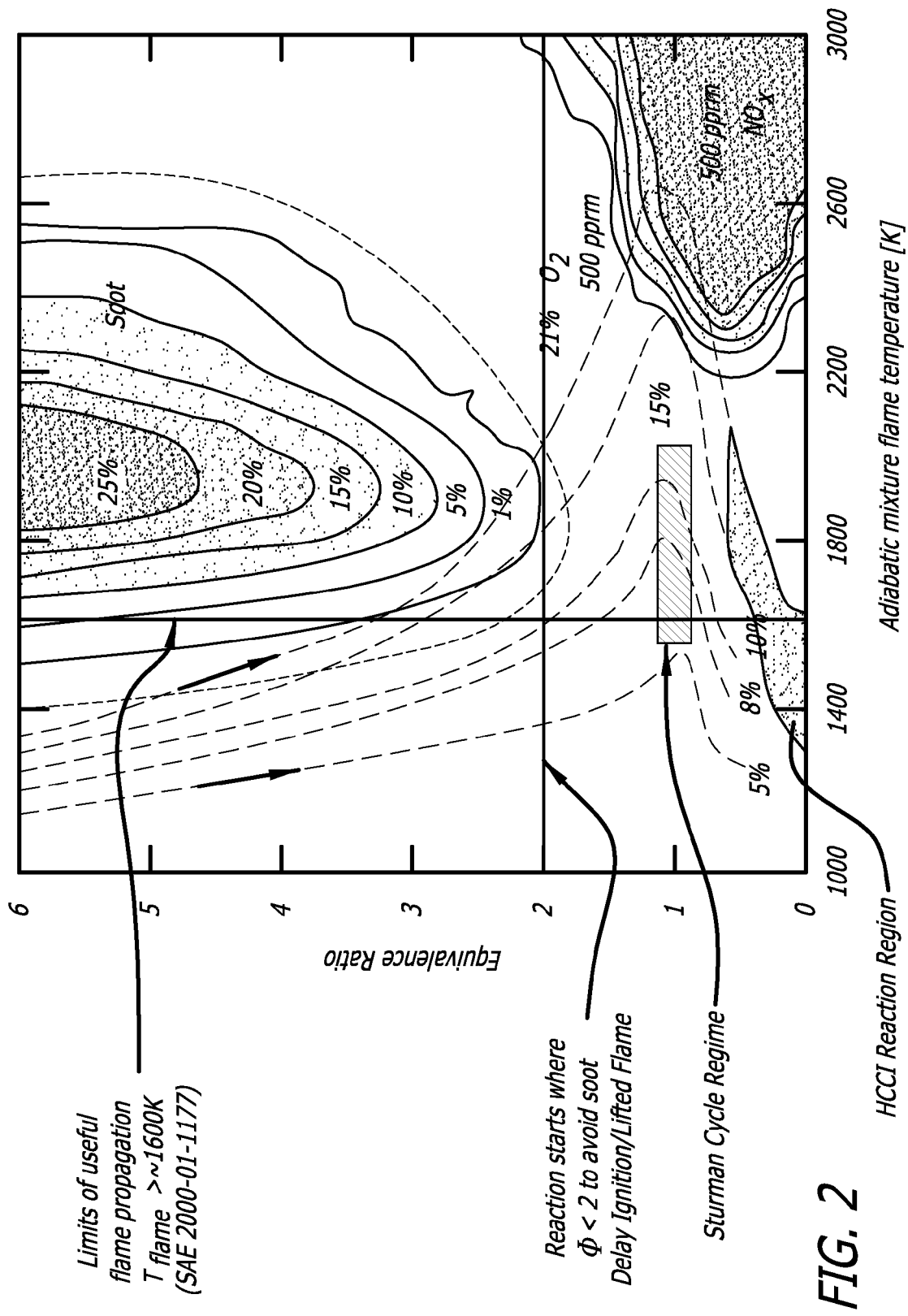
FIG. 2 pictorially displays the regimes in which soot and $NO_X$ are formed in a plot of Equivalence Ratio versus Flame Temperature.

In the operation of an engine in accordance with the Sturman cycle of FIGS. 1 and 2, it will be noted that both ignition and combustion during the power stroke are purposely limited in temperature to temperatures below which $NO_X$ will form. For ignition, this is easily achieved, as ignition occurs when fuel and air are not the main constituents in the combustion chamber, as there will be substantial exhaust gas in the combustion chamber also, providing a heat load that holds the temperature attained down. During the power stroke and the corresponding injections, because of the combination of the expansion and associated cooling of the contents of the combustion chamber and the increasing total contents of the combustion chamber because of the prior injections during the power stroke, the increased rate of injection of air and fuel until all fuel and air to be injected during that power stroke has been injected can be controlled to not significantly change (raise) the temperature in the combustion chamber during the power stroke. However the maintenance of the combustion through an increase crankshaft angle after top dead center is highly advantageous, as that provides an improved conversion of combustion chamber pressure to mechanical energy.

With respect to fuels to be used, obviously conventional diesel fuel works well. However, because of the full control of the fuel injection, air injection and engine valve timing, other fuels may also be used, such as biofuels and even gaseous fuels. With respect to fuels that require a higher temperature for compression ignition than conventional diesel fuel, starting and warmup of the engine may be by use of diesel fuel in a conventional four stroke diesel cycle. Alternatively the engine may be designed (head design in a retrofit) to achieve the required temperature, particularly for starting, through such expedients as a higher compression ratio, intake air heaters, etc.

Thus the present invention has a number of aspects, which aspects may be practiced alone or in various combinations or sub-combinations, as desired. While preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A method of operating a multi-cylinder compression ignition engine having at least one cylinder acting as a compression cylinder and at least one cylinder action as a combustion cylinder, comprising:
    a) compressing air in the compression cylinder;
    b) in the combustion cylinder;
        1) opening and then closing an exhaust valve during an exhaust stroke to trap some exhaust gas in the combustion cylinder;
        2) during a compression stoke immediately following the exhaust stroke of b)1), injecting a controlled amount of fuel into the combustion chamber to obtain compression ignition at or near a top dead center piston position without reaching combustion temperatures at which $NO_X$ is formed;
        3) injecting compressed air and fuel during a power stroke immediately following the compression stroke of b)2) to sustain combustion to burn the fuel with an equivalence ratio within a predetermined range around unity.

2. The method of claim 1 wherein in b)3), the compressed air and fuel are injected to sustain combustion without reaching combustion temperatures at which $NO_X$ is formed.

3. The method of claim 1 wherein the engine is a camless engine.

4. The method of claim 1 wherein in b)2), compression ignition is obtained using the residual air in the exhaust gas trapped in b).

5. The method of claim 1 further comprising injecting some air into the combustion cylinder as the piston approaches the top dead center position in b)2) to provide enough air for compression ignition.

6. The method of claim 1 wherein in b)3), the compressed air and fuel are alternately injected.

7. The method of claim 6 wherein the alternate injections overlap each other.

8. The method of claim 1 wherein in b)3), the compressed air and fuel are injected simultaneously.

9. The method of claim 1 wherein in b)3), the compressed air and fuel are alternately injected, each in increasing amounts.

10. The method of claim 1 wherein all cylinders of the multi-cylinder engine may, at different times, act as compression cylinders and combustion cylinders.

11. The method of claim 10 wherein each cylinder is cycled between acting as a compression cylinder and as a combustion cylinder.

12. The method of claim 1 wherein the fuel is a conventional diesel fuel.

13. The method of claim 1 wherein the fuel is a biodiesel fuel.

14. The method of claim 1 wherein the fuel is a gaseous fuel.

15. The method of claim 1 wherein an air storage tank is coupled to the combustion and compression cylinders to receive compressed air from cylinders being used as compression cylinders for delivery to the cylinders to being used as combustion cylinders.

16. A method of operating a multi-cylinder compression ignition engine having at least one cylinder acting as a compression cylinder and at least one cylinder action as a combustion cylinder, comprising:
    in a camless engine;
    a) compressing air in the compression cylinder;
    b) in the combustion cylinder;

1) opening and then closing an exhaust valve during an exhaust stroke to trap some exhaust gas in the combustion cylinder;
2) during a compression stoke immediately following the exhaust stroke of b)1), injecting a controlled amount of fuel into the combustion chamber to obtain compression ignition at or near a top dead center piston position without reaching combustion temperatures at which $NO_X$ is formed;
3) injecting compressed air and fuel during a power stroke immediately following the compression stroke of b)2) to sustain combustion to burn the fuel with an equivalence ratio within a predetermined range around unity without reaching combustion temperatures at which $NO_X$ is formed.

17. The method of claim 16 wherein in b)2), compression ignition is obtained using the residual air in the exhaust gas trapped in b).

18. The method of claim 16 further comprising injecting some air into the combustion cylinder as the piston approaches the top dead center position in b)2) to provide enough air for compression ignition.

19. The method of claim 16 wherein in b)3), the compressed air and fuel are alternately injected.

20. The method of claim 19 wherein the alternate injections overlap each other.

21. The method of claim 16 wherein in b)3), the compressed air and fuel are injected simultaneously.

22. The method of claim 16 wherein in b)3), the compressed air and fuel are alternately injected, each in increasing amounts.

23. The method of claim 16 wherein all cylinders of the multi-cylinder engine may, at different times, act as compression cylinders and combustion cylinders.

24. The method of claim 23 wherein each cylinder is cycled between acting as a compression cylinder and as a combustion cylinder.

25. The method of claim 16 wherein the fuel is a conventional diesel fuel.

26. The method of claim 16 wherein the fuel is a biodiesel fuel.

27. The method of claim 16 wherein the fuel is a gaseous fuel.

28. The method of claim 16 wherein an air storage tank is coupled to the combustion and compression cylinders to receive compressed air from cylinders being used as compression cylinders for delivery to the cylinders to being used as combustion cylinders.

* * * * *